July 21, 1959  S. L. ADELSON  2,895,494
DEVICE FOR PRODUCING PRESSURES VARYING PROPORTIONALLY
TO VARIATIONS IN A CONDITION
Filed Aug. 9, 1954
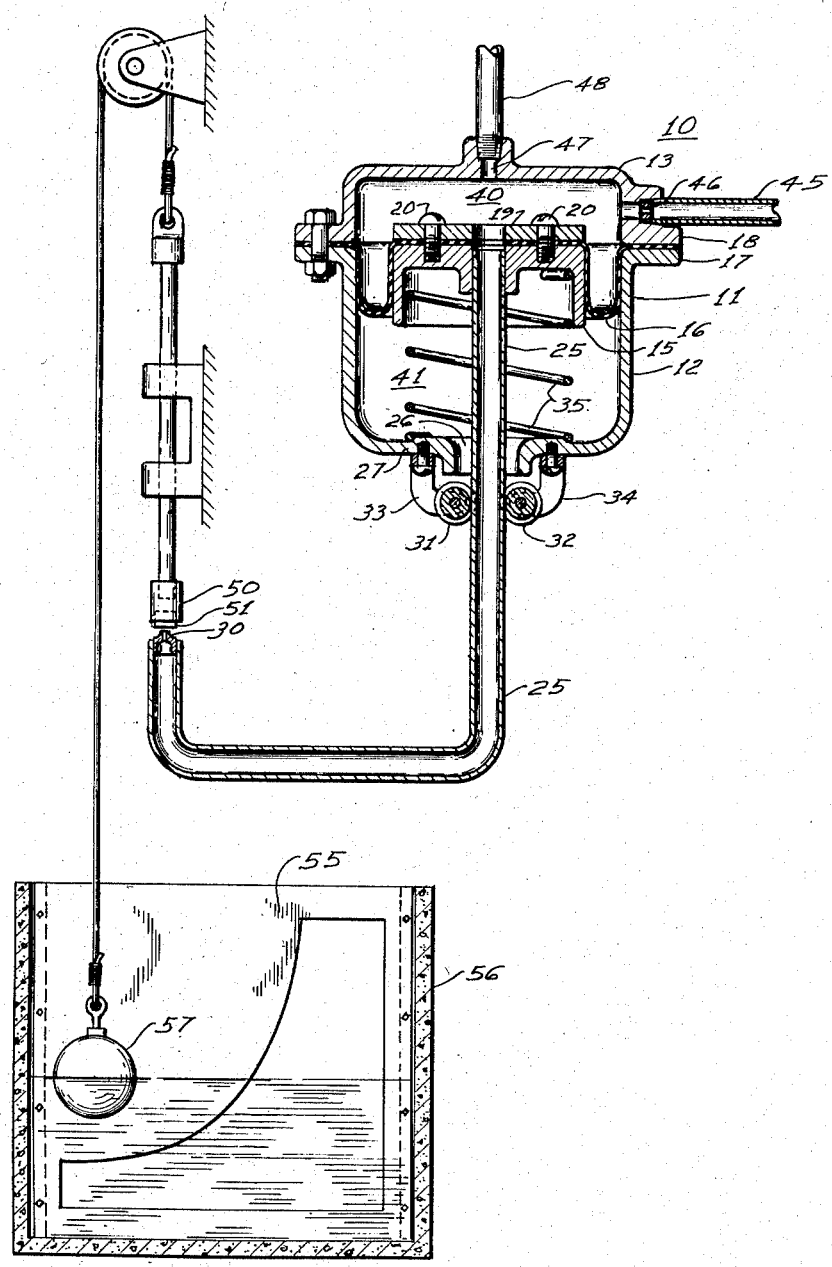

2,895,494
DEVICE FOR PRODUCING PRESSURES VARYING PROPORTIONALLY TO VARIATIONS IN A CONDITION

Samuel L. Adelson, Tucson, Ariz., assignor to Infilco Incorporated, Tucson, Ariz., a corporation of Delaware Application August 9, 1954, Serial No. 448,730

4 Claims. (Cl. 137—85)

This invention relates to a device for producing pressures varying proportionally to variations in a condition, and particularly for producing gas pressures of this type.

It is an object of this invention to provide a simple and accurate device for producing pressures varying proportionally to variations in a condition.

Another object of the invention is to provide a receiver utilizing the movement of a member from a zero position through distances proportional to changes in a condition to provide a gas pressure which is proportional to the condition.

A specific object of the invention is to provide a device utilizing the movements of a member of a flow meter which are proportional to the flow rate for providing an air or other gas pressure proportional to the flow rate.

Other objects will become apparent from consideration of the detailed description and the claims which follow.

To obtain a gas pressure varying proportionally to variations of a condition, for example, of the flow rate through a conduit, it is usual to provide a pressure differential creating device, for example a venturi tube or an orifice, if the condition is a flow rate, and a converter which converts the pressure differential obtained from the presure differential creating device to a controlled air pressure varying proportionally with the condition, such as the flow rate.

This invention permits utilizing any member that moves from a zero position through distances proportional to variations of a condition to directly obtain an air or other gas pressure varying proportionally to the varying condition. For example, such a member can be part of a liquid flow meter, if the condition is the rate of flow through a conduit; or it can be a part of a thermometer, if the gas pressure is to be proportional to temperature changes; or part of a voltmeter, if the pressure is to be proportional to an electromotive force.

The invention will be more readily understood by reference to the drawing, which shows a device according to the invention in vertical cross section.

The receiver 10 comprises a casing 11 formed by a body 12 and a cap 13. An annular piston 15 is sealed to the casing 11 by a roller type diaphragm 16 whose outer edge is clamped between flanges 17 and 18 of the body 12 and the cap 13, respectively, and whose inner edge is held in place between the piston 15 and an annular keeper plate 19, which is fastened to the piston 15 by any suitable means, such as screws 20. The piston 15 has a hollow piston rod 25 which extends to the outside of the casing 11 through an aperture 26 in the wall 27 of the body 12, and terminates in a nozzle 30, as shown. The piston rod 25 is held axially aligned with respect to the aperture 26 by any suitable means, such as guide rollers 31 and 32 mounted on brackets 33 and 34, respectively. A compression spring 35 is seated with one end against a spring seat provided in the piston 15 and with its other end against a shoulder in the wall 27.

The piston 15 and diaphragm 16 form in the casing 11 an air pressure chamber 40, which communicates with the atmosphere through the nozzle 30 and a spring chamber 41, which communicates with the atmosphere through the aperture 26. The spring 35 opposes movement of the piston 15 due to air pressure in chamber 40. The distance piston 15 moves from its zero position for a given spring rate is proportional to the pressure on the diaphragm 16 and the effective area of the diaphragm 16.

Air or gas under substantially constant pressure is admitted to the air pressure chamber 40 through a pipe 45 provided with a restriction 46. The air pressure chamber 40 is provided with a port 47 to receive a conduit 48 for transmitting the pressure prevailing in air pressure chamber 40 to a device, not shown, which is to be operated in proportion to variations in the control condition.

A member 50, whose movements are proportional to variations in the control condition, carries a disc 51, preferably of resilient material, which is axially aligned with the orifice 30. For purposes of illustration the member 50 is diagrammatically shown as connected with a rate of flow meter, including a Sutro weir 55 installed in a channel 56, and a float 57 placed in the channel 56 so that its movements are in linear relation to the flow rate over the weir. It will be understood, however, that other types of flow meters can be used where the control condition is a rate of flow, and that the element 50 can be responsive to variation in any condition to which a proportional gas pressure is to be established.

Under equilibrium conditions, as shown in the drawing, there is a gap between the disc 51 and the nozzle 30 of such size that the air entering the air pressure chamber 40 can escape through nozzle 30 at the rate at which it enters. The pressure in chamber 40 corresponds to the amount the spring 35 has been compressed. When the value of the control condition, such as the rate of flow over the Sutro weir 55, increases, the disc 51 moves to reduce the gap or seal the nozzle 30. Thereupon, the pressure in air pressure chamber 40 immediately increases, and the spring 35 is further compressed so that it permits the piston 15 and piston rod 25 to move downwardly to restore the gap between nozzle 30 and disc 51 substantially to its initial size.

As long as disc 51 moves towards the nozzle 30 due to increase in the value of the control condition, the air pressure in chamber 40 will increase, the spring 35 will be further compressed, the piston 15 will move downwardly, and the nozzle 30 will be moved away from the disc 51.

When the control condition becomes stabilized and movement of the member 50 ceases, there will be a momentary slight increase in the gap between the disc 51 and the nozzle 30, which will then quickly adjust itself to the size where air can escape through the nozzle 30 as fast as it enters the chamber 40. Equilibrium is now established between the higher value of the control condition (such as the flow rate over the Sutro weir), and a correspondingly higher pressure in chamber 40, which keeps the piston 15 in its new position against the force of the more compressed spring 35. The pressure now prevailing in chamber 40 is proportional to the then value of the control condition, and is transmitted through line 48 to the point of application.

Should the value of the control condition decrease, then the disc 51 will move away from the nozzle 30, and the air gap will be increased so that air can escape through nozzle 30 at a higher rate than it enters chamber 40. This causes an immediate drop in pressure in chamber 40 which reduces the compression of spring 35, thereby permitting piston 15 to move upwardly, so that the nozzle 30 approaches the disc 51 to restore the gap to the size where the air again escapes from nozzle 30 at the rate at which it enters the chamber 40.

Upon continued movement of the disc 51, the nozzle 30 will follow the disc until the disc stops moving, when the control condition has become stabilized at a new lower value. Equilibrium is then established between the decreased value of the control condition and the reduced pressure in chamber 40, which is again balanced by the force of the spring 35 which is now less strongly compressed. The pressure now prevailing in chamber 40 is proportional to the then value of the control condition, and is transmitted through line 48 to the point of application.

It will be seen that the invention provides a very simple and exact means for obtaining an air pressure which varies proportionally to variations in a condition. There are numerous applications for such a proportional air pressure in connection with many different conditions, so that the invention is useful in a wide field.

I claim:

1. In combination with a metering element moving from a zero position through distances which are proportional to variations in a condition, means for obtaining a gas pressure varying proportionally to variations of said condition, comprising a nozzle axially aligned with said element, a gas pressure chamber in fluid connection with said nozzle, an inlet for gas under substantially constant pressure to said gas pressure chamber, there being normally between said element and said nozzle a gap of such size that gas escapes through said nozzle at the rate at which it enters said chamber, a pressure port in said gas pressure chamber adapted to be connected to a point of application of the pressure therein, and means operative when said element moves relative to said nozzle due to a change in the value of said condition to instantaneously cause said nozzle to follow the movement of said element over the entire range of said movements and restore a gap of substantially normal size for any position of said element, said means consisting of a piston having a hollow piston rod, a roller-type flexible diaphragm sealing said piston to a wall of said gas pressure chamber and permitting said piston to move substantially without friction, said hollow piston rod connecting said chamber and said nozzle, and a compression spring opposing movement of said piston due to gas pressure in said chamber.

2. Means for obtaining a gas pressure varying proportionally to the variations of a rate of flow, comprising a metering element adapted to move from a zero position through distances proportional to variations in the rate of flow, a gas pressure chamber having a movable wall including a roller-type flexible diaphragm, means for admitting to said gas pressure chamber gas under substantially constant pressure exerting a force on said movable wall in one direction, a spring chamber open to atmosphere, a compression spring in said spring chamber exerting on said movable wall a force acting in the opposite direction, a conduit affixed to said movable wall, said conduit being in open fluid connection with said gas pressure chamber and extending therefrom through and to outside said spring chamber, a nozzle at the outlet end of said conduit axially aligned with said element, there being at equilibrium between said nozzle and said element a gap of such size that gas entering said gas pressure chamber escapes through said nozzle at the rate at which it enters said chamber, said nozzle, upon movement of said element relative to said nozzle due to a change in the value of said rate of flow, being moved instantaneously by said movable wall due to the resulting change in pressure in said gas pressure chamber to follow the movement of said element and restore said gap for any position of said element to the size where gas escapes at the rate at which it enters, said roller-type diaphragm permitting said nozzle to follow said element over the entire range of movements of said element without substantially friction, and a pressure port in said gas pressure chamber through which the pressure prevailing in said chamber is transmitted to a point of application.

3. Means for obtaining a gas pressure varying proportionally to variations in a condition, comprising an element adapted to move from a zero position through distances proportional to variations in the condition, a gas pressure chamber, a spring chamber open to atmosphere, a piston having a hollow piston rod in unrestricted fluid connection with said gas pressure chamber with one end, a roller-type flexible diapragm sealing said piston to a wall of said gas pressure chamber and forming with said piston another wall of said gas pressure chamber, said piston rod extending through and to outside said spring chamber, a nozzle at the other end of said piston rod and in axial alignment with said element, means for admitting to said gas pressure chamber gas under substantially constant pressure exerting a force on said piston in one direction, a compression spring in said spring chamber exerting a force on said piston in the opposite direction, there being at equilibrium between said nozzle and said element a gap of such size that gas entering said gas pressure chamber escapes through said nozzle at the rate at which it enters said gas pressure chamber, said nozzle, upon movement of said element relative to said nozzle due to a change in the value of said condition, being moved instantaneously by said piston due to the corresponding change in pressure in said gas pressure chamber without substantial friction to restore said gap to the size where gas escapes at the rate at which it enters, whereby equilibrium is established with said nozzle in a new position corresponding to said changed pressure in said gas pressure chamber, and a pressure port in said gas pressure chamber through which the pressure prevailing in said gas pressure chamber is transmitted to a point of application.

4. In combination with a metering element moving from a zero position through distances which are proportional to variations in a rate of flow, a device for obtaining a controlled gas pressure varying proportionally to variations in said rate of flow, comprising a gas pressure chamber, an inlet for gas under substantially constant pressure to said gas pressure chamber, a pressure port in said gas pressure chamber adapted to be connected to a point of application of the pressure therein, a roller-type flexible diaphragm forming one wall of said chamber, the outside of said diaphragm being under atmospheric pressure, a spring acting on said diaphragm in opposition to the gas pressure in said chamber, a nozzle affixed to said diaphragm and in fluid connection with said chamber, said nozzle being axially aligned with said element and spaced therefrom at equilibrium to form a gap through which gas escapes at the rate at which it enters said chamber and movable free of substantial friction to follow the movements of said element in response to variations in said rate of flow over the entire operating range of said device so as to form with said element, in each of its positions, a gap through which gas can escape at the rate at which it enters said chamber, whereby said nozzle has a different equilibrium position for each increment of the range of operation of said device and the gas pressure in said chamber is always proportional to the then value of said rate of flow.

References Cited in the file of this patent

UNITED STATES PATENTS 368,089    Hinds _____ Aug. 9, 1887

(Other references on following page)

UNITED STATES PATENTS

| | | |
|---|---|---|
| 1,038,636 | Oxnard | Sept. 17, 1912 |
| 1,039,157 | Mackintosh | Sept. 24, 1912 |
| 1,834,773 | Fellmann et al. | Dec. 1, 1931 |
| 2,153,381 | Maas | Apr. 4, 1939 |
| 2,165,657 | Schaeren | July 11, 1939 |
| 2,185,449 | Veenschoten | Jan. 2, 1940 |
| 2,248,322 | Annin | July 8, 1941 |
| 2,310,298 | Kuhl et al. | Feb. 9, 1943 |
| 2,616,397 | Ruud et al. | Nov. 4, 1952 |
| 2,638,874 | Woodhull | May 19, 1953 |
| 2,670,716 | Worster et al. | Mar. 2, 1954 |
| 2,720,864 | Smith | Oct. 18, 1955 |
| 2,731,534 | Hansen | Jan. 17, 1956 |

FOREIGN PATENTS

| | | |
|---|---|---|
| 276,692 | Germany | July 17, 1914 |
| 650,983 | France | Oct. 2, 1928 |